Reissued Feb. 14, 1928. Re. 16,880

UNITED STATES PATENT OFFICE.

PAUL BARTSCH, OF WASHINGTON, DISTRICT OF COLUMBIA.

METHOD OF WOOD PROTECTION.

No Drawing. Original No. 1,374,806, dated April 12, 1921, Serial No. 419,063, filed October 23, 1920. Application for reissue filed July 15, 1927. Serial No. 206,122.

This invention relates to a method of treating wood whereby it is protected against shipworms, borers, dry rot and fungus decay.

The various methods employed heretofore for protecting wood subject to the action of water against shipworms, borers, dry rot and fungus decay have been inefficient. Where creosote is used as a protective medium it will leach out in a varying length of time, depending upon the temperature of the water, leaving the wood exposed to the ravages of the destructive organisms sooner or later. Poisons supplied to the fibers of the wood by existing methods will not penetrate far enough to insure complete protection and after the thin outer shell of the wood has been removed, the rest can easily be destroyed by the invading organisms.

One of the objects of the present invention is to completely poison all the tissues of the wood, the steps of the process being such as to cause the poisons to permeate all the cells, fibers, vessels, ducts and pores, as well as the intercellular spaces in the wood, thereby rendering the wood immune against the attack of destructive organisms.

Another object is to seal up all the poisons with which the tissues have been impregnated, thereby preventing them from leaching out when the treated wood is subjected to rain or submerged in fresh or salt water.

Another object is to so treat the wood that every newly cut surface will expose a poison which will promptly kill borers ingesting bits of the wood, with the result that shipworms and other destructive animals will not have a chance to burrow into the wood because the microscopic larval form or adult will be killed long before it will have buried itself within the tissues of the wood.

A further object is to so treat the wood as to completely extract the water and resin from the cells, fibers, vessels, ducts and pores, as well as the intercellular spaces in the wood and replace them by the poisons and the sealing medium.

With the foregoing and other objects in view, which will appear as the description proceeds, the invention consists in first completely deresinizing the wood with a resin solvent such as xylol or turpentine or any other chemical used for such purposes until complete deresinization has taken place. This step of the method leaves the wood in a completely deresinized condition with the cells, fibers, vessels, ducts and pores, as well as the intercellular spaces in the wood, saturated with the resin solvent. This solvent is then replaced by alcohol, or any other water miscible solution that can be employed for such purpose. The wood is next immersed in water in which the above solvent is removed. (Where non-resinous woods are treated the deresinizing process may be eliminated and the wood may be subjected at once to the poisoning process which follows.) The deresinized wood is next subjected to saturated solutions of arsenic and copper compounds which will, consequently, fill the cells, fibers, vessels, ducts and pores, as well as the intercellular spaces in the wood. The wood is next saturated with a precipitant, such as alcohol, which will precipitate the poisons within the tissues of the wood. This precipitation step is also a part of the next feature of our treatment, that is, complete dehydration, which is essential to secure complete penetration of the paraffin. The next step consists in replacing the liquid in the wood with a paraffin solvent such as turpentine. Finally the wood is immersed in paraffin heated to above the melting point and which has been poisoned with arsenic and copper salts. The turpentine in the wood will be displaced by the paraffin which, in turn, will completely impregnate the wood and seal the poisons, thereby protecting them from the action of water and preventing leaching.

It will be apparent, from the foregoing, that the wood treated in the manner set forth will contain encapsuled poison in every cell, fiber, vessel, duct and pore, as well as in the intercellular spaces in the wood, throughout the thickness of the wood. The poisoned paraffin, while toxic itself, will seal up all the poisons with which the tissues have been impregnated. The arsenic compounds will poison the animal preying upon the wood; in the case of dry rot or fungus, the copper salts will have an equally toxic effect upon those organisms, should they attempt to penetrate the treated wood.

What I claim is:

1. The method of protecting wood comprising dehydration and saturation of the wood with melted poisoned paraffin.

2. The method of protecting wood comprising dehydration and saturation of the wood with paraffin poisoned with arsenic and copper compounds.

3. The hereindescribed method of protecting wood from organisms which consists in dehydration of the wood, impregnation of the wood with a saturated solution of poison, precipitation of the poison within the cells, fibers, pores, ducts, vessels and intercellular spaces in the wood, and sealing the minute particles of precipitated poison within the cells, fibers, pores, ducts, vessels and intercellular spaces in the wood with poisoned paraffin.

4. The hereindescribed method of protecting wood from organisms, which consists in deresinizing the wood with a resin solvent, removing the solvent, subjecting the wood to a saturated solution of poison, dehydrating the wood and precipitating the poison within the tissues of the wood, displacing the dehydrant by a paraffin solvent, and immersing the wood in melted poisoned paraffin, to completely impregnate the wood with the paraffin.

5. The hereindescribed method of protecting wood from destructive organisms, which consists in deresinizing the wood by means of a solvent, removing the solvent and resin, replacing this with a chemical that will not only replace the resin solvent but will, in turn, be replaced by an aqueous solution of arsenic and copper, then chemically dehydrating the wood to cause precipitation of the poisons, then replacing the dehydrant by a paraffin solvent and finally replacing the paraffin solvent by poisoned paraffin.

PAUL BARTSCH.